United States Patent [19]

Matchell

[11] 4,164,761
[45] Aug. 14, 1979

[54] TELECINE APPARATUS HAVING IMPROVED REPRODUCTION DURING PANNING AND TILTING SCENES

[75] Inventor: Raymond Matchell, Braughing, Nr. Ware, England

[73] Assignee: The Rank Organisation Limited, London, England

[21] Appl. No.: 907,193

[22] Filed: May 18, 1978

[30] Foreign Application Priority Data

May 18, 1977 [GB] United Kingdom ............... 20903/77

[51] Int. Cl.$^2$ .............................................. H04N 5/88
[52] U.S. Cl. .................................. 358/215; 358/214; 358/216
[58] Field of Search ............................... 358/214–216, 358/54, 130–132, 125, 126; 315/394, 395

[56] References Cited

U.S. PATENT DOCUMENTS 3,410,954  11/1968  Erde ..................... 358/214

Primary Examiner—John C. Martin
Attorney, Agent, or Firm—Brisebois & Kruger

[57] ABSTRACT

This invention relates to a method and apparatus for improving the reproduction of a television picture derived from a cinema film by a telecine apparatus during a period of panning and/or tilting in the scene recorded on the cinema film. The improvement is achieved by shifting the scanning raster of the telecine apparatus in respect of at least selected television fields during the panning or tilting period in such manner that during a series of consecutive television fields an image of an object moving across the television picture is reproduced in the television picture in a greater number of positions along its direction of movement than the number of film frames from which the series of consecutive television fields is derived.

10 Claims, 9 Drawing Figures

TELECINE APPARATUS HAVING IMPROVED REPRODUCTION DURING PANNING AND TILTING SCENES

This invention relates to a method and apparatus for improving the reproduction of a television picture derived from a cinema film by a telecine apparatus during a period of "panning" or "tilting" in the scene recorded on the film.

Moving film cameras produce a number of still pictures per second, the most commonly used nembers being 24 or 25 frames per second. The developed film is then projected directly on to a screen by an optical projector, or used in telecine apparatus to produce a television picture. If the film camera is "panned" - i.e. caused to rotate horizontally across the scene being filmed, or "tilted" - i.e. caused to rotate vertically, objectionable picture break up effects may occur. This is due to the fact that stationary objects in the scene appear in a number of discrete positions corresponding to the 24 or 25 pictures per second taken by the camera.

The degree of unpleasantness caused by this effect is dependent not only on the rate of "pan" or "tilt" but also on the method used to display the film, e.g. direct projection, flying spot telecine, or photoconductive telecine.

The effect is most objectionable when displayed via a flying spot telecine system as this is a non-storage system but it can also be observed on direct projection or via photoconductive telecine.

The object of the present invention is to reduce the above unpleasant effect produced when cinema film is displayed on television via telecine equipment.

Accordingly, the present invention provides a method of improving the reproduction of a television picture derived from a cinema film by a telecine apparatus during a period of panning and/or tilting in the scene recorded on the cinema film, the method comprising shifting the scanning raster of the telecine apparatus in respect of at least selected television fields during said period in such manner that during a series of consecutive television fields an image of an object moving across the television picture is reproduced in the television picture in a greater number of positions along its direction of movement than the number of film frames from which said series of television fields is derived.

In one embodiment of the invention the telecine apparatus derives two television fields from each film frame, and the scanning raster is shifted in such manner that in the second field of each film frame the image is reproduced at a position intermediate its position in the first field of the same film frame and its position in the first field of the immediately succeeding film frame.

In a second embodiment of the invention the telecine apparatus derives alternately two and three television fields from consecutive film frames, and the scanning raster is shifted in such manner that in the second field of each group of two fields the image is reproduced at a position intermediate its position in the first field of the same group and its position in the first field of the immediately succeeding group of three fields, and in the second and third fields of each group of three fields the image is reproduced at positions intermediate its position in the first field of the same group and its position in the first field of the immediately succeeding group of two fields.

An apparatus for performing the first embodiment comprises respective correction circuits for horizontal and vertical shifting of the scanning raster, wherein each correction circuit comprises means for generating a series of pulses at half the field frequency, each pulse having a duration substantially equal to one field period, means for selectively inverting the pulses and means for adjusting the amplitude of the pulses, the horizontal and vertical correction circuits further comprising respective means for supplying the pulses, after processing by the amplitude adjusting means and the selective inverting means, to respective horizontal and vertical deflecting means for shifting the scanning raster.

An apparatus for performing the second embodiment comprises respective correction circuits for horizontal and vertical shifting of the scanning raster, wherein each correction circuit comprises means for generating a series of pulses of which each pulse has a duration of one field period, the series of pulses comprising three component series of pulses of different pulse amplitude and one fifth the field frequency with the pulses of greatest amplitude being delayed by one field period relative to the pulses of least amplitude and by three field periods relative to the pulses of intermediate amplitude, means for selectively inverting the pulses, and means for adjusting the amplitude of the pulses, the horizontal and vertical correction circuits further comprising respective means for supplying the pulses, after processing by the amplitude adjusting means and the selective inverting means, to respective horizontal and vertical deflecting means for shifting the scanning raster.

The embodiments of the invention will now be described, by way of example, with reference to the accompanying drawings, in which.

Figure 1:
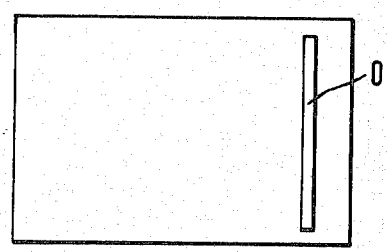
FIGS. 1 to 5 illustrate the first embodiment of the invention.
Figure 2:
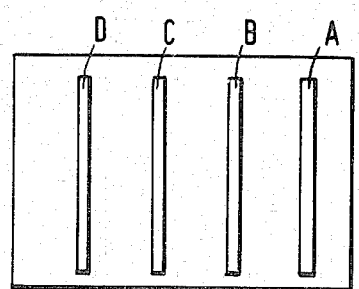

Referring now to FIGS. 1 to 5, if we consider an original scene as in FIG. 1, and imagine a film camera being panned from left to right, the object O will be recorded in consecutive frames of the film in a number of distinct positions A, B, C and D shown in FIG. 2 in relation to a single film frame area represented by the rectangular boundary. Although only four recorded positions of the object O are shown, corresponding to four film frames, the actual number of positions will depend in each case upon the rate of panning, since the slower rate of panning the greater the number of film frames exposed during the movement of the camera relative to the object and therefore the greater the number of recorded positions.

In a 625/50 flying spot telecine apparatus, as is well known, the cinema film is run at 25 film frames per second and each film frame is scanned twice to derive two consecutive television fields - the interlaced and non-interlaced fields. Thus when reproduced by such a telecine apparatus, the four frames of film represented by FIG. 2 will be scanned eight times to derive eight consecutive television fields. As shown at the bottom of FIG. 2, fields 1 and 2 will correspond to the film frame having the object at position A, fields 3 and 4 will correspond to the next film frame having the object at position B, and so on. Thus when reproduced on a television screen, the image of the object O will again be reproduced in four positions corresponding to the positions A, B, C and D, and thus FIG. 2 may also be taken to represent the positions of the image of the object on the television screen for the four television frames (each television frame equals two fields) corresponding to the four film frames under consideration. As mentioned above, this can give rise to unpleasant picture break-up effects particularly with flying spot telecines.

Figure 3:
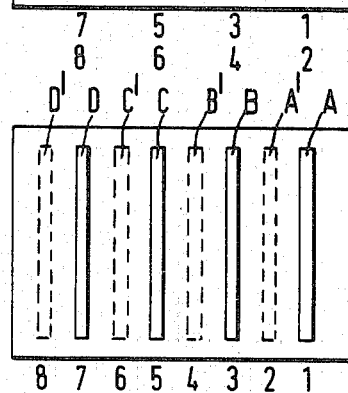

However, this effect can be reduced if the telecine apparatus scanning raster is shifted horizontally, relative to the film being scanned, in respect of interlaced fields only, the shift being of such amplitude that the images produced by the interlaced fields fall symmetrically between those produced by the non-interlaced fields. The effect of this shifting is shown in FIG. 3. The reactangular boundary represents the area of the displayed television picture and A, B, C and D represent the positions of the image on the non-interlaced fields 1, 3, 5 and 7, these positions being the same as those of FIG. 2 since the non-interlaced fields have not been shifted relative to the film. On the interlaced fields 2, 4, 6 and 8, however, due to the shifting of the scanning raster, the image is produced at positions A', B', C', and D' intermediate the positions on the non-interlaced fields. The result is that during the series of eight consecutive television fields under consideration the image of the object moving across the television picture is reproduced in a greater number of positions (in this case twice as many) along its direction of movement than the number of film frames from which the eight consecutive fields are derived. This gives a greatly increased simulation of continuous movement.

Figure 4:
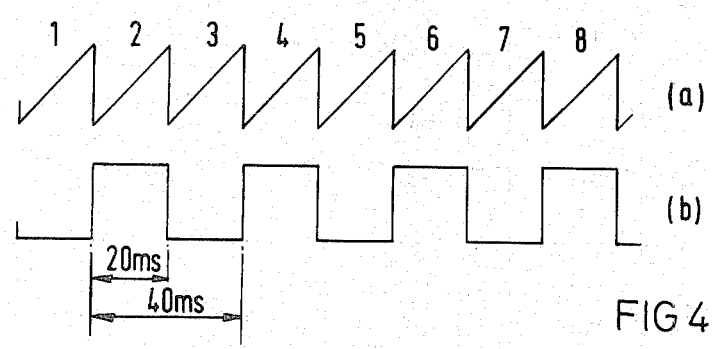

The shift applied to the telecine scanning raster can be produced by providing an auxiliary or correction voltage to the scanning system of the telecine. The correction voltage must clearly be a series of pulses at half the field frequency as it must be effective only in respect of interlaced fields, and the pulses must each have a duration of substantially one field period. FIG. 4 shows the required pulses, line b, and their timing relative to the television fields, line a. The pulses shown in line b must be adjustable in magnitude and polarity to allow for different directions of panning and different rates of panning respectively.

Figure 5:
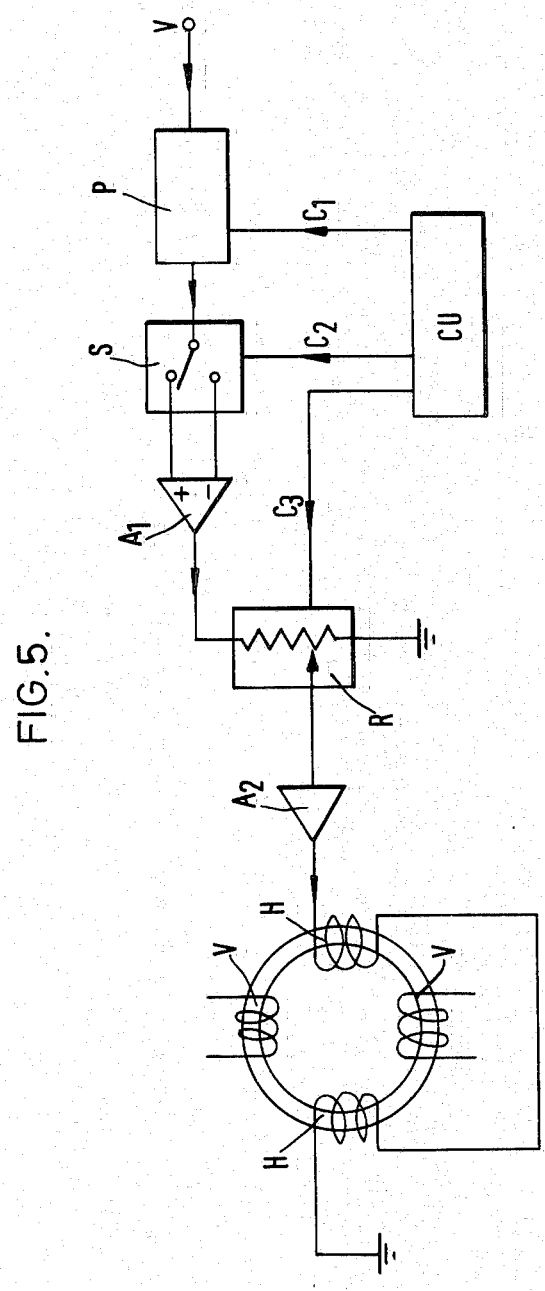

In order to provide the necessary shifting described above, the horizontal correction circuit shown in FIG. 5 may be used. A pulse generator P is arranged to generate a series of pulses of half field frequency and each of substantially one field period in duration. The pulses generated by P are synchronised with the television fields in the telecine apparatus by vertical synchronising signals applied at the terminal V, so that the pulses are available simultaneously with the interlaced fields, as shown in FIG. 4. The pulses are not generated continuously but only when a correction is desired during a period of panning in the scene recorded on the cinema film. The initiation and halting of the pulse generation by the pulse generator P is determined by control signals $C_1$ from a control unit CU.

The pulses from P are supplied through a two-way switch S to an amplifier $A_1$ having inverting and non-inverting inputs. The setting of the switch S is determined by a second control signal $C_2$, and in dependence upon the setting the pulses from P are delivered either to the inverting or non-inverting input of the amplifier $A_1$. Thus the switch S and amplifier $A_1$ together allow selective inversion of the polarity of the pulses. This is necessary to allow correction in either direction of panning, since clearly the scanning raster will require shifting in opposite directions for opposite directions of movement of the object relative to the screen.

The pulses from amplifier $A_1$ are delivered to a potentiometer P which allows the amplitude of the pulses to be adjusted for different panning rates. Clearly, if the panning rate is slow the object will be displayed on the screen at more closely spaced positions than if the panning rate is high, and the scanning raster will therefore require a smaller shift on the interlaced fields. The setting of the potentiometer P is determined, in accordance with the panning rate, by control signals $C_3$ from the control unit.

Finally, the pulses are delivered through a driving amplifier $A_2$ to an auxiliary set of deflection coils H introduced around the neck of the cathode ray tube in the flying spot telecine apparatus. The deflection coils H are arranged to influence the horizontal position of the scanning raster, whereby the pulses applied thereto by the amplifier $A_2$ produce a horizontal shift of the raster in respect of interlaced fields. Alternatively it is possible to add the pulses to the normal horizontal deflection potential of the telecine employing means well established in the art, thereby dispensing with the need for auxiliary coils H.

It is to be noted that, apart from the means for applying the pulses to the telecine apparatus, the latter may be entirely conventional and the details thereof are therefore not described.

The foregoing has dealt exclusively with the correction of horizontal or panning movement of an object recorded on the cinema film. However, it is to be understood that the situation in respect of tilting (i.e. vertical movement of the camera) is analogous. Once again the object is reproduced at a number of distinct positions in successive film frames (in this case the positions are vertically displaced) and in a conventional telecine apparatus the object would be reproduced in the same number of positions on the television screen. By shifting the scanning raster vertically on interlaced fields by the correct amount, the number of displayed positions on the television screen can be increased in the same way as already described for the horizontal case.

The vertical correction circuit for achieving this may be precisely the same as that shown in FIG. 5 for the horizontal correction, with the exception that the pulses, after adjustment in respect of amplitude and polarity, are applied not to the auxiliary coils H but to auxiliary coils V which in this case influence the vertical position of the scanning raster, or are added to the normal vertical deflection potential of the telecine apparatus. For this reason the vertical correction circuit is not shown in the drawings, but it is to be understood that it may consist of a circuit identical to FIG. 5 but connected to the coils V, an for economy will share the same pulse generator P as the horizontal correction circuit.

The vertical correction circuit is controlled independently of (except in respect of the common pulse generator P) but in a similar manner to the horizontal correction circuit by control signals from the control unit CU, so as to correct for different rates and direction of tilt. It will be apparent that using separately controlled horizontal and vertical correction circuits as described, not only planning or tilting movements alone may be corrected, but also movements at an angle to the horizontal and vertical, for example movements diagonally of the screen. In such a case, it is the component of the motion in the relevant direction which determines the required settings of the switch S and potentiometer R in each correction circuit. Where the two correction circuits share a common pulse generator P, each circuit will comprise a switch (not shown) whereby the passage of pulses in the circuit may be interrupted in the case where compensation is only required to be effected by the other circuit.

In practise the desired settings of the correction circuits at any stage in the showing of the film will be determined by previewing the film and making the required adjustments to the control signals manually to achieve best compensation. The adjusted values of the control signals may then be recorded together with the film frame members at which the desired correction starts and ends. Although the correction may be switched in manually at the correct time, it is preferable that an automatic device be programmed to supply the control signals at the appropriate times in accordance with the film frame numbers. Several devices are known which supply various control signals to a telecine apparatus at predetermined times (although for other purposes) and any of these can be readily adapted to supply the necessary control signals for the horizontal and vertical correction circuits described above. The apparatus known as the "Cintel Colorgrade" marketed by the Rank Organisation may be readily adapted for this purpose.

Obviously it is possible to apply the correction to the non interlaced field rather than the interlaced field or to apply correction in opposite directions to both interlaced and non-interlaced fields. This latter is easily achieved by the use of a transformer to drive the auxiliary deflection coils. In this case the mean value of the correction waveform will cause zero deflection and correction will then appear for both positive and negative variations from the mean value.

FIGS. 6 to 9 illustrate the application of the invention to the United States 525/60 television standard. In a 525/60 telecine apparatus the cinema film is run at 24 frames per second and consecutive film frames are alternately scanned two and three times so that alternate groups of two and three television fields are derived from consecutive film frames. In this case, therefore, a simple shifting in respect of alternate (interlaced) fields is not possible.

Figure 6:
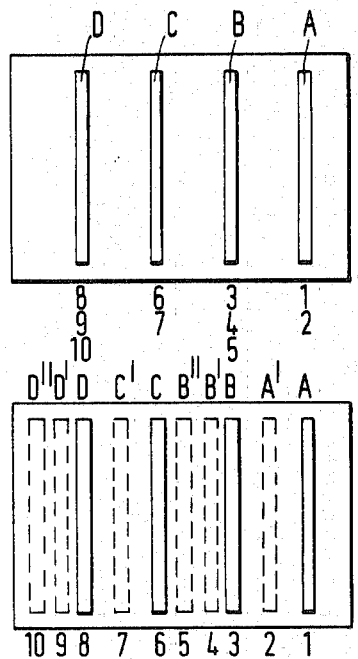
FIG. 6 to 9 illustrate the second embodiment of the invention.

The situation is shown in FIG. 6 for the horizontal direction of movement (panning). For the four film frames represented in FIG. 2, the image of the object is reproduced at position A during fields 1 and 2, at position B during fields 3, 4 and 5, at position C during fields 6 and 7, and so on. In this case the four film frames correspond to ten television fields, but again the object is only displayed in four positions during those ten fields when reproduced by a conventional 525/60 telecine apparatus.

Figure 7:
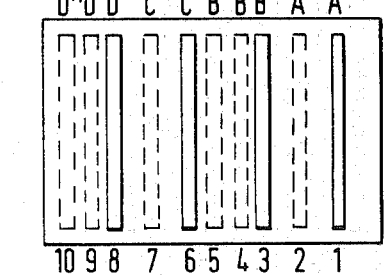

By applying the invention, however, it is possible to shift the scanning raster in respect of fields 2, 4, 5, 7 . . . etc. (that is all except the first field of each film frame) so that the images for these fields fall intermediate the images produced by fields 1, 2, 3, 4 as shown in FIG. 7. In FIG. 7, A, B, C and D illustrate the positions of the image for the unshifted fields and $A^1$, $B^1$, $B^{11}$, $C^1$... etc. illustrate the positions of the image for the shifted fields.

Figure 8:
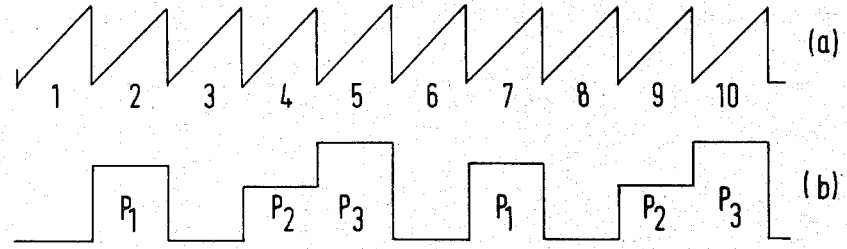

The required series of pulses for effecting such shifting is shown in line b of FIG. 8, and its timing with regard to the television fields is apparent by comparison with line a of FIG. 8 which represents the television fields.

It will be seen that the series of pulses required comprises in effect three component series of pulses $P_1$, $P_2$ and $P_3$ of different pulse amplitude and each at one fifth the field frequency. Furthermore, the pulses $P_2$ have $\frac{2}{3}$ the amplitude of the pulses $P_1$ and $\frac{1}{2}$ the amplitude of the pulses $P_3$. Each pulse has a duration of substantially one field period, and the pulses $P_3$ are delayed by one field period relative to the pulse $P_2$ and by three field periods relative to the pulses $P_1$. This particular composite pulse series, when adjusted in respect of polarity and overall amplitude, will produce the best correction with images such as $A^1$ midway between A and B and images such as $B^1$ and $B^{11}$ respectively one third and two-thirds the distance between B and C.

Figure 9:
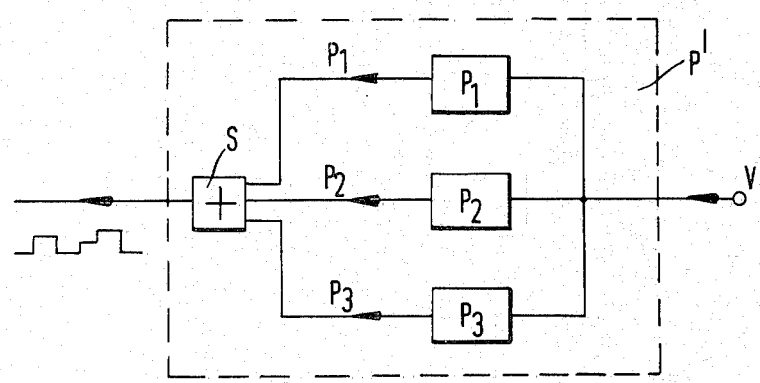

A circuit $P^1$ for producing such a composite pulse series is shown in FIG. 9. The circuit $P^1$ comprises three separate pulse generators $P_1$, $P_2$, $P_3$ synchronised by vertical synchronising signals at terminal V to produce in known manner the individual pulse series $P_1$, $P_2$ and $P_3$ respectively. These are then added in the adding cirucit S to produce the composite output.

In performing the invention in respect of the 525/60 television system, horizontal and vertical correction circuits similar to those already described for the 625/50 system may be used, with the difference that the pulse generator $P^1$ of FIG. 9 is substituted for the pulse generator P of the earlier described correction circuits. Otherwise the correction circuits can be identical to those of FIG. 5 although such circuits will of course in the present case be coupled to a 525/60 telecine apparatus. Thus no separate detailed description of correction circuits for the 525/60 system is thought necessary.

I claim:

1. A method of improving the reproduction of a television picture derived from a cinema film by a telecine apparatus during a period of panning and/or tilting in the scene recorded on the cinema film, the method comprising shifting the scanning raster of the telecine apparatus in respect of at least selected television fields during said period in such manner that during a series of consecutive television fields an image of an object moving across the television picture is reproduced in the television picture in a greater number of positions along its direction of movement than the number of film frames from which the said series of consecutive television fields is derived.

2. A method as claimed in claim 1, wherein in the telecine apparatus two television fields are derived from each film frame, and wherein the scanning raster is shifted in such manner that in the second field of each film frame the image is reproduced at a position intermediate its position in the first field of the same film frame and its position in the first field of the immediately succeeding film frame.

3. A method as claimed in claim 1, wherein the telecine apparatus alternate groups of two and three television fields are derived from consecutive film frames, and wherein the scanning raster is shifted in such manner that in the second field of each group of two fields the image is reproduced at a position intermediate its position in the first field of the same group and its position in the first fields of the immediately succeeding group of three fields, and in the second and third fields of each group of three fields the image is reproduced at positions intermediate its position in the first field of the same group and its position in the first field of the immediately succeeding group of two fields.

4. An apparatus for improving the reproduction of a television picture derived from a cinema film by a telecine apparatus during a period of panning and/or tilting in the scene recorded on the cinema film, the apparatus comprising means for shifting the scanning raster of the telecine apparatus in respect of at least selected television fields during said period in such manner that during a series of consecutive television fields an image of an object moving across the television picture is reproduced in the television picture in a greater number of positions along its direction of movement than the number of film frames from which the said series of consecutive television fields is derived.

5. An apparatus as claimed in claim 4, wherein in the telecine apparatus two television fields are derived from each film frame, and wherein the shifting means comprises means for shifting the scanning raster in such manner that in the second field of each film frame the image is reproduced at a position intermediate its position in the first field of the same film frame and its position in the first field of the immediately succeeding film frame.

6. An apparatus as claimed in claim 4, wherein in the telecine apparatus alternate groups of two and three television fields are derived from consecutive film frames, and wherein the shifting means comprises means for shifting the scanning raster in such manner that in the second field of each group of two fields the image is reproduced at a position intermediate its position in the first field of the same group and its position in the first field of the immediately succeeding group of the three fields, and in the second and third fields of each group of three fields the image is reproduced at positions intermediate its position in the first field of the same group and its position in the first field of the immediately succeeding group of two fields.

7. An apparatus as claimed in claim 5, wherein the shifting means comprises respective correction circuits for horizontal and vertical shifting of the scanning raster, wherein each correction circuit comprises means for generating a series of pulses at half the field frequency, each pulse having a duration substantially equal to one field period, means for selectively inverting the pulses, and means for adjusting the amplitude of the pulses, the horizontal and vertical correction circuits further comprising respective means for supplying the pulses, after processing by the amplitude adjusting means and the selective inverting means, to respective horizontal and vertical deflecting means for shifting the scanning raster.

8. An apparatus as claimed in claim 6, wherein the shifting means comprises respective correction circuits for horizontal and vertical shifting of the scanning raster, wherein each correction circuit comprises means for generating a series of pulses of which each pulse has a duration of one field period, the series of pulses comprising three component series of pulses of different pulse amplitude and one fifth the field frequency with the pulses of greatest amplitude being delayed by one field period relative to the pulses of least amplitude and by three field periods relative to the pulses of intermediate amplitude, means for selectively inverting the pulses, and means for adjusting the amplitude of the pulses, the horizontal and vertical correction circuits further comprising respective means for supplying the pulses, after processing by the amplitude adjusting means and the selective inverting means, to respective horizontal and vertical deflecting means for shifting the scanning raster.

9. An apparatus as claimed in claim 7, further comprising means for automatically controlling the selective inverting means and the amplitude adjusting means whereby during a period of panning and/or tilting in the scene recorded on the cinema film pulses of correct amplitude and polarity are supplied to the vertical and/or horizontal deflection means.

10. An apparatus as claimed in claim 8, further comprising means for automatically controlling the selective inverting means and the amplitude adjusting means whereby during a period of panning and/or tilting in the scene recorded on the cinema film pulses of correct amplitude and polarity are supplied to the vertical and/or horizontal deflection means.

* * * * *